United States Patent

Grice

[11] Patent Number: 5,915,943
[45] Date of Patent: Jun. 29, 1999

[54] FISHING ROD WITH BULGE

[75] Inventor: Steven L. Grice, Spirit Lake, Iowa

[73] Assignee: Berkley Inc., Spirit Lake, Iowa

[21] Appl. No.: 08/842,214

[22] Filed: Apr. 24, 1997

[51] Int. Cl.$^6$ ................................................. A01K 87/00
[52] U.S. Cl. ................................................. 43/25; 43/18.1
[58] Field of Search ................................ 43/18.1, 18.5, 43/25

[56] References Cited

U.S. PATENT DOCUMENTS

| | | |
|---|---|---|
| 3,216,144 | 11/1965 | Vojinov ................................ 43/18.1 |
| 3,452,468 | 7/1969 | Green . |
| 3,461,593 | 8/1969 | Martuch et al. . |
| 3,469,338 | 9/1969 | Hills ................................... 43/18.5 |
| 3,570,164 | 3/1971 | Tozier . |
| 4,015,360 | 4/1977 | Herter . |
| 4,024,666 | 5/1977 | Carver . |
| 4,214,395 | 7/1980 | Caldwell . |
| 4,464,856 | 8/1984 | Holden et al. . |
| 4,656,773 | 4/1987 | Klefbeck . |
| 4,738,046 | 4/1988 | Fraylick et al. . |
| 4,800,668 | 1/1989 | Burrough . |
| 5,369,904 | 12/1994 | Vogts et al. . |

FOREIGN PATENT DOCUMENTS

| | | |
|---|---|---|
| 5-276854 | of 0000 | Japan . |
| 7-83670 | of 0000 | Japan . |
| 420650 | 12/1934 | United Kingdom ............ 43/18.1 |

*Primary Examiner*—Jack W. Lavinder
*Attorney, Agent, or Firm*—Roylance, Abrams, Berdo & Goodman, L.L.P.

[57] ABSTRACT

Fishing rods have a bulged section within two line guides from the handle, within the last four guides, or a combination of bulged zones. Fishing rods with at least one bulged section are able to cast further.

19 Claims, 2 Drawing Sheets

FISHING ROD WITH BULGE

FIELD OF THE INVENTION

The invention relates to a fishing rod that exhibits one or more sections of tapering enlarged diameter in the rod blank near the handle, near the tip, or both.

BACKGROUND OF THE INVENTION

Casting distance is a performance criteria that has been long recognized as important for fishing rods. Among other characteristics, casting distance dictates line guide placement, rod length, lure weight, and the modulus of the reinforcing fibers used in the rod blank composite.

The fishing rods that have come from research and design into such matters has generally been based on a rod composite rod blank that smoothly tapers from butt to tip, passing through substantially the length of an added handle section ("blank-thru" design). Line guides using one or two attached foot sections are chosen and placed to minimize interference between the line guide attachment locations and the flexural profile of the rod. Single and double footed line guides may both be used on the same rod in locations where interference is minimized.

The increased casting distance made possible by these previous design improvements has extended the effective casting distance of a rod (all other thing being equal. Anglers are able to fish from new locations made accessible to the water from a longer casting distance. Perhaps more importantly and infinitely more difficult to prove, longer casting distances have resulted in an increased action time in the water thereby resulting in an increased catch. Despite the improvements made by the art, there exists a continuing need and desire for a fishing rod design that will, with a given rod length, composite composition, and lure weight, cast the lure further than conventional rods.

SUMMARY OF THE INVENTION

It is an object of the invention to provide a fishing rod design that is able to cast a given lure further under comparable conditions.

In accordance with this objective and other that will become apparent from the description herein, a fishing rod having a handle, a tip, a stripper guide, a tip guide, and a plurality of intermediate line guides on a fishing rod blank, is characterized by the improvement that includes: a fishing rod blank having a double tapered bulge section at a handle end zone within two line guides of said handle or at a tip end zone within four line guides from said tip. The bulged section can be located within the first two guides from the handle, the last four guides on the tip end, or a combination of a bulged section in each zone.

Fishing rods of the invention cast further than conventional rods under comparable conditions. The design of the blank and the placement of the tapering bulge or bulges makes more efficient use of the casting energy within the rod blank.

DETAILED DESCRIPTION

Figure 1:
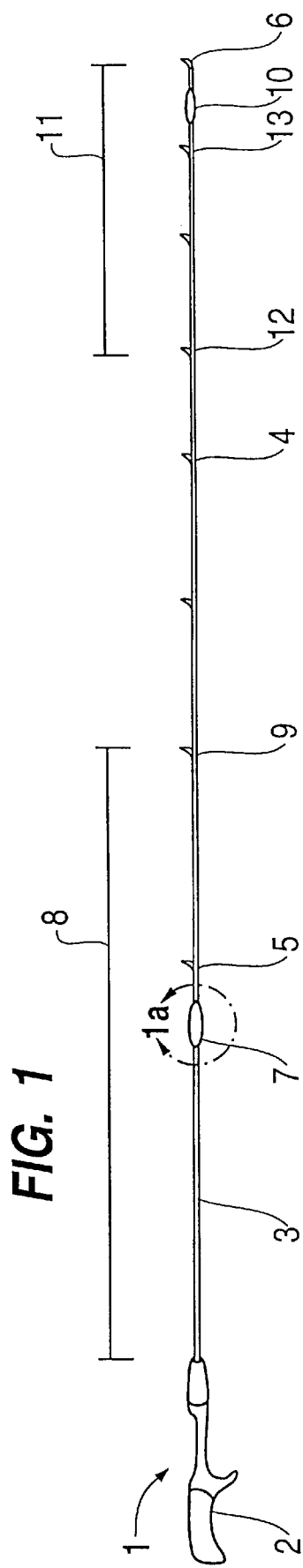
FIGS. 1 and 1a are an illustration of where double tapered bulged section may be placed according to the invention.
Figure 1A:
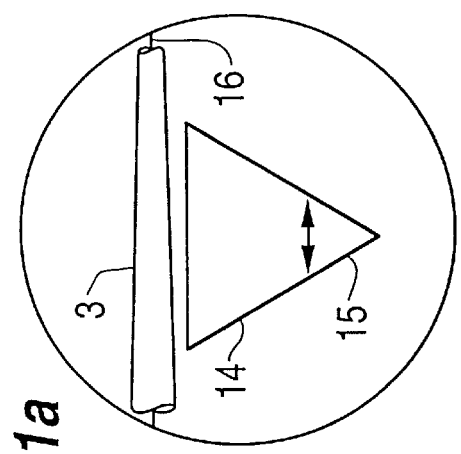

Fishing rods according to the invention are made with a blank having a bulged section (a) in a handle end zone between the end of the handle and the second guide, preferably at a location between the handle and the first guide; (b) in a tip end zone between the tip guide and the fourth guide from the tip, preferably between the tip guide and the immediate next guide; or (c) in both the handle end zone and the tip end zone. A fishing rod with a bulged section in each of the handle end and the tip end is particularly preferred.

The rod blanks of the present invention will exhibit a length generally within the range from about 4–9 feet and can be used to make a wide variety of freshwater and saltwater fishing rods where a casting motion is used to deliver the lure.

The fishing rods of the invention are made from fiber reinforced composites. The fibers are generally selected from graphite, glass, aramid, ultrahigh molecular weight polyethylene, boron, VECTRAN™, and mixtures thereof. The preferred composite is graphite fibers in a resinous matrix. Such composites are commercially available in sheet form "prepregs" that can be cut to shape and rolled on a removable tapered mandrel. Once cured, the mandrel is removed, the surfaces sanded to a smooth finish and given a clear, durable finish coating.

A tapering bulged section is formed on the rod blank by wrapping a generally triangular piece of cloth prepreg or unidirectional fiber prepreg on the blank where the bulge is desired. The reinforcing fibers used in the triangular piece can be the same or different than the fibers used in the prepreg used to make the rod blank and may be oriented along the axis of the rod (along the rod length), transverse (for added hoop strength), or at some angle relative to the rod axis.

The length of the triangular base and height are selected to form a double tapered bulge on the surface of the blank that provides a seamless transition from the surface of the blank to the maximum elevation of the bulge and back to the blank surface. Such a seamless transition avoids the formation of external step increases that can place inordinate amounts of point stress on the rod blank during dynamic flexure.

For a bulged section near the handle in a handle end zone, the bulge is preferably located within two line guides from the end of the handle and is 10–150 mm (0.5–6 inches) long at a peak bulge height diameter of 1–4 mm (0.040–0.15 inches). The ratio of bulge peak diameter to blank diameter is preferably within the range of about 0.70 to about 0.95 and more preferably within the range of 0.72–0.89. In particular, the handle zone bulge is located just to the handle side of the first ("stripper"), i.e., between the end of the handle and the first guide. A bulge in this zone appears to form a smoothly transitioning double bend that extracts additional energy from the handle end of the blank during the casting action that results in a longer cast. The precise mechanism through which this effect occurs is not known.

For a bulged section near the tip end, the bulge is preferably located within the last four line guides and is 10–125 mm (0.5–5 inches) long at a peak bulge height diameter of 0.4–2.5 mm (0.015–0.1 inch). The ratio of bulge peak diameter to blank diameter is preferably within the range of about 0.65 to about 0.85 and more preferably within the range of 0.69–0.82. In particular, the tip bulge is located between the last guide (the "tip top") and the immediately preceding, next-to-last guide. A bulge in this zone, while affecting flexural profile to some extent, acts primarily as an integral tip end weight that allows the tip end to realize a higher tip momentum during the cast that will throw the lure further.

In its most preferred form, a fishing rod according to the invention exhibits a bulge in the handle end zone and another bulge in the tip end zone. Each bulge is made with a graphite fiber composite in which all fibers are aligned with the rod axis.

The invention is conveniently described with reference to FIG. 1. In that figure, fishing rod 1 is made with handle 2, rod blank 3, and a plurality of line guides 4 including stripper guide 5 and tip guide 6. First bulge section 7 is located within handle end zone 8 between second line guide 9 and the end of handle 2. Preferably, first bulge section 7 is between the handle and immediately adjacent stripper guide 5.

Second bulge section 10 is located within tip end zone 11 that is within four line guides from the rod tip, i.e., between tip guide 6 and fourth guide 12. Preferably, tip zone bulge 10 is between tip guide 6 and the second guide 13 back from tip guide 6. More preferably, the tip zone bulge 10 is adjacent tip guide 6.

Regardless of where located, a bulge can be formed on the surface of blank 3 by wrapping prepreg in a generally triangular shape 14 onto the blank surface either before curing (thereby co-curing the blank and bulge) or after the blank is formed (requiring a subsequent curing step). The length and height of the triangle in conjunction with the blank diameter at the chosen location will determine the length and height of the bulge dimensions.

Within the triangular prepreg, reinforcing fibers 15 are oriented to be along the axis 16 of fishing rod 1 (as shown) although the fibers can be in the form of a cloth (50% longitudinal, 50% transverse to rod axis), or otherwise positioned at some angle or mixture of angles to the rod axis. In general, longitudinal fiber orientation is preferred due to the ease of rolling the prepreg onto the blank.

For a handle end zone bulge 7, the ratios of beginning and ending blank diameter to peak diameter are generally within the range of 0.70–0.95. The tip zone bulge will have blank diameter ratios within the range of 0.65–0.82. The specific ratio of diameters in the bulge sections will differ depending on which end of the bulge is measured for determining the blank diameter because the blank tapers from handle to tip.

Figure 2:
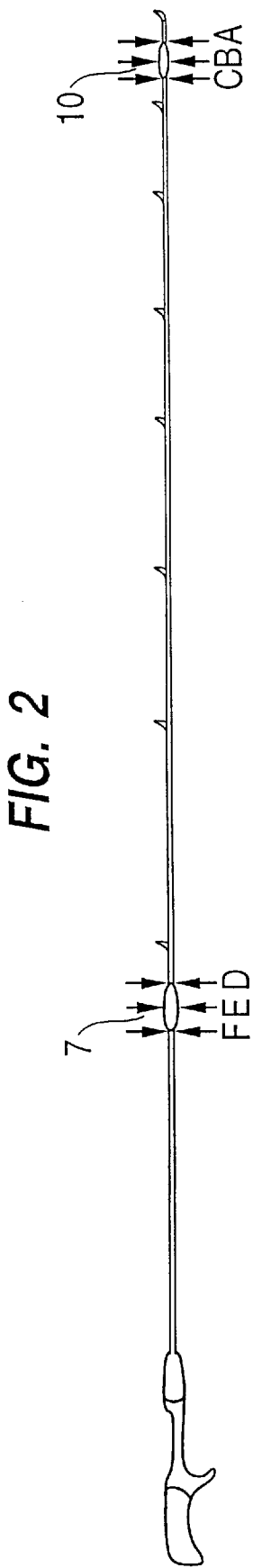
FIG. 2 illustrates positions that can be used for determining bulge proportions.

Table 1 reports some actual proportions of two fishing rods made according to the invention. Reference positions are shown in FIG. 2. In general, the "starting" diameter is the diameter of the blank before the diameter begins to increase due to the added prepreg wrap and vice versa for the diameter after the bulge ends.

TABLE 1

|  | Rod 1 | Rod 2 |
| --- | --- | --- |
| Tip blank end dia. (A) | 0.104" | 0.110" |
| Tip bulge peak dia. (B) | 0.147" | 0.145" |
| Tip blank start dia. (C) | 0.111" | 0.117" |
| Starting bulge ratio C:B | 0.707 | 0.759 |
| Ending bulge ratio A:B | 0.755 | 0.807 |
| Handle blank end dia. (D) | 0.369" | 0.408" |
| Handle bulge peak dia. (E) | 0.490" | 0.533" |
| Handle blank start dia. (F) | 0.418" | 0.468" |
| Starting bulge ratio F:E | 0.753 | 0.765 |
| End bulge ratio D:E | 0.853 | 0.878 |

I claim:

1. In a fishing rod comprising a handle, a tip, a stripper guide, a tip guide, and a plurality of intermediate line guides on a fishing rod blank, the improvement comprising:

a fishing rod blank having a double tapered bulge section at a handle end zone between said handle and said stripper guide for increasing the rod's capability to make longer casts.

2. A fishing rod according to claim 1 wherein said bulge section is 10–150 mm long at a peak bulge height of 1–4 mm.

3. A fishing rod according to claim 1 wherein said bulge section is adjacent said stripper guide.

4. A fishing rod according to claim 1 wherein said bulge exhibits a ratio of blank diameter to peak diameter within the range of 0.70–0.95.

5. A fishing rod according to claim 1 wherein said bulge section is 10–125 mm long at a peak bulge height of 0.4–2.5 mm.

6. A fishing rod according to claim 1 wherein said bulge exhibits a ratio of blank diameter to peak diameter within the range of 0.65–0.85.

7. A fishing rod according to claim 1 wherein said bulge section is a first bulge section within said handle end zone and said blank further comprises a second bulge section at said tip end zone.

8. A fishing rod according to claim 7 wherein first bulge section is 10–150 mm long at a peak bulge height of 1–4 mm.

9. A fishing rod according to claim 7 wherein said first bulge section is adjacent said stripper guide.

10. A fishing rod according to claim 7 wherein said first bulge exhibits a ratio of blank diameter to peak diameter within the range of 0.70–0.95.

11. A fishing rod according to claim 7 wherein said second bulge section is 10–125 mm long at a peak bulge height of 0.4–2.5 mm.

12. A fishing rod according to claim 7 wherein said second bulge section is located within four line guides from said tip.

13. A fishing rod according to claim 12 wherein said second bulge section is adjacent said tip guide.

14. A fishing rod according to claim 7 wherein said second bulge exhibits a ratio of blank diameter to peak diameter within the range of 0.65–0.85.

15. In a fishing rod comprising a handle, a tip, a stripper guide, a tip guide, and a plurality of intermediate line guides on a fishing rod blank, the improvement comprising:

a fishing rod blank having a double tapered bulge section at a tip end zone between said tip guide and an immediately adjacent line guide for increasing the rod's capability to make longer casts.

16. A fishing rod according to claim 15 wherein said bulge section is 10–150 mm long at a peak bulge height of 1–4 mm.

17. A fishing rod according to claim 15 wherein said bulge exhibits a ratio of blank diameter to peak diameter within the range of 0.80–0.95.

18. A fishing rod according to claim 15 wherein said bulge section is 10–125 mm long at a peak bulge height of 0.4–2.5 mm.

19. A fishing rod according to claim 15 wherein said bulge exhibits a ratio of blank diameter to peak diameter within the range of 0.65–0.85.

* * * * *